(No Model.) 2 Sheets—Sheet 1.
A. LOEWENTHAL.
COOKING STOVE.
No. 499,128. Patented June 6, 1893.
Fig. I.
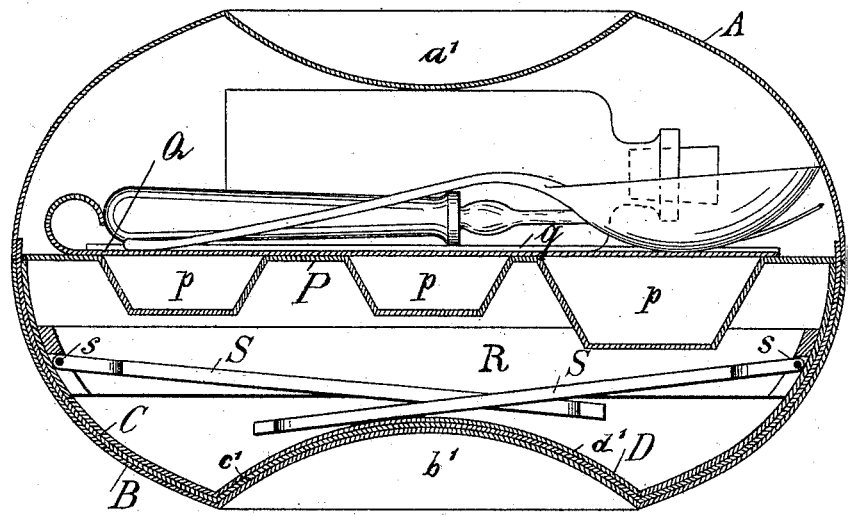
Fig. II.
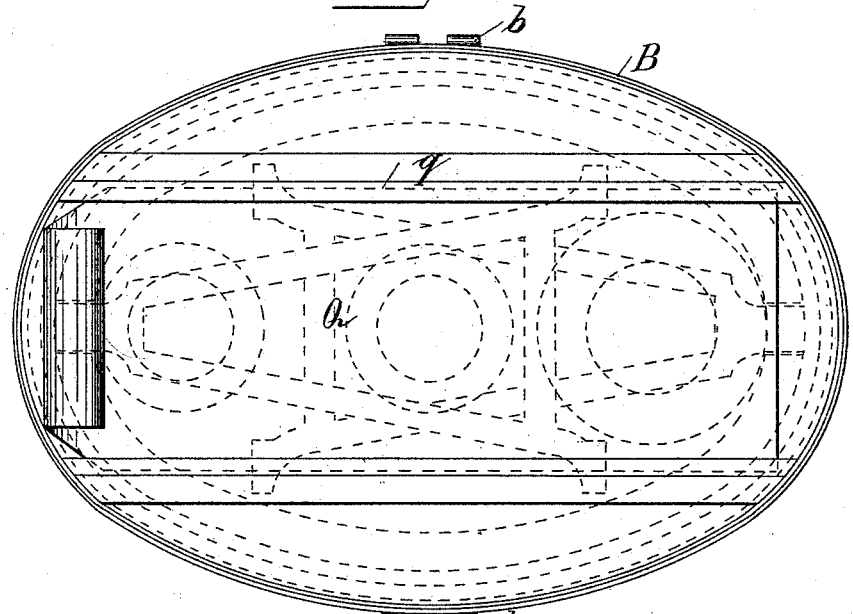
WITNESSES:
C. Sedgwick
E. M. Clark
INVENTOR
A. Loewenthal
BY
Munn & Co
ATTORNEYS.

(No Model.) 2 Sheets—Sheet 2.
A. LOEWENTHAL.
COOKING STOVE.
No. 499,128. Patented June 6, 1893.
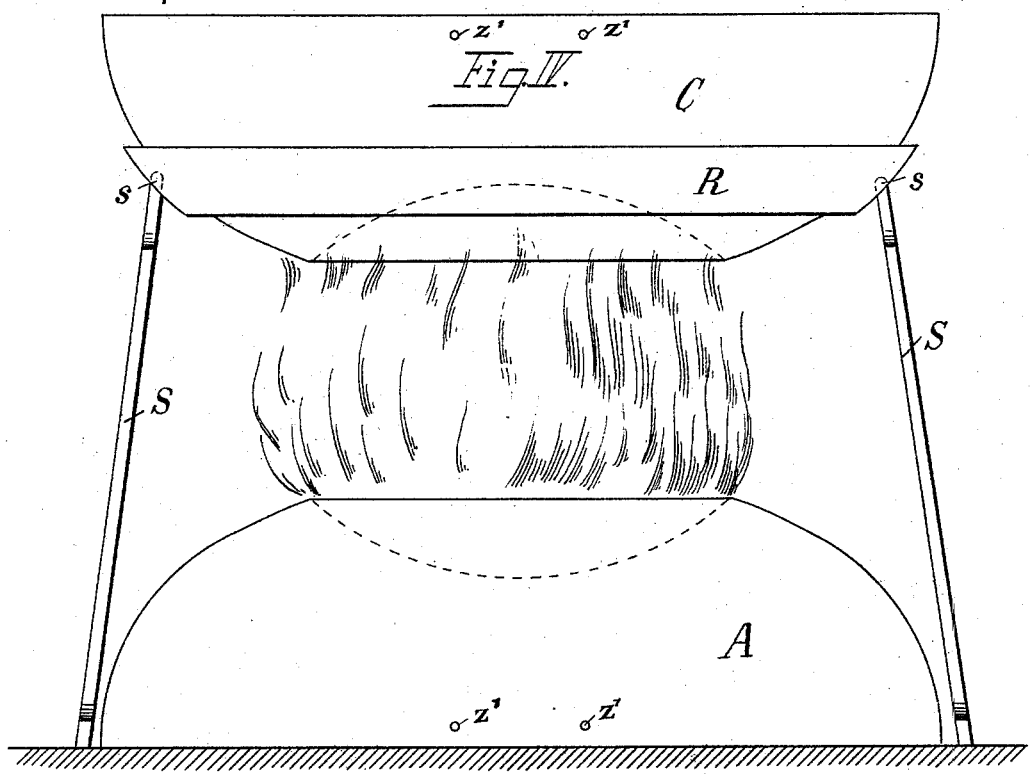
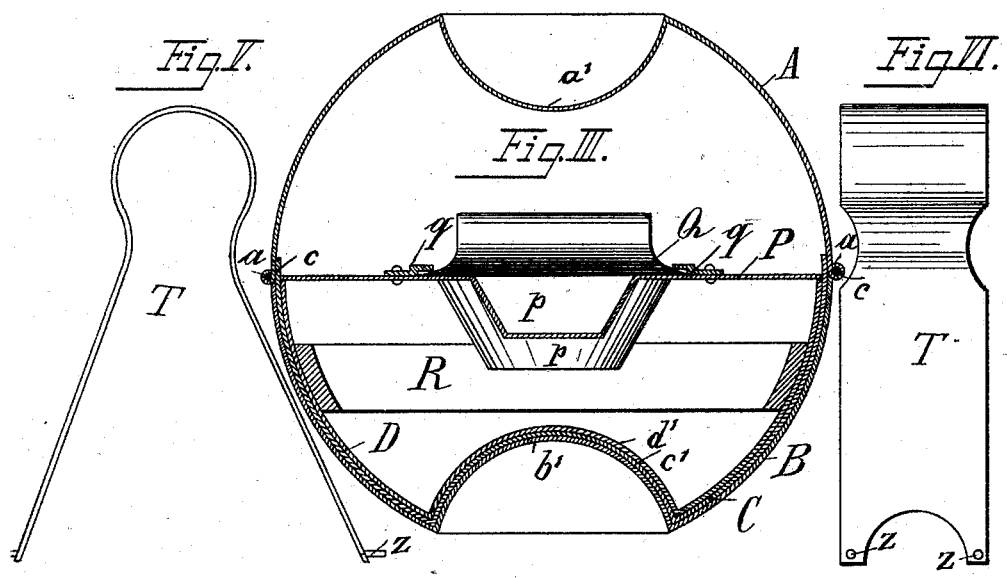
WITNESSES:
C. Sedgwick
E. M. Clark
INVENTOR
A. Loewenthal
BY
Munn & Co
ATTORNEYS.

UNITED STATES PATENT OFFICE.

ALBERT LOEWENTHAL, OF BERLIN, GERMANY.

COOKING-STOVE.

SPECIFICATION forming part of Letters Patent No. 499,128, dated June 6, 1893.

Application filed December 3, 1892. Serial No. 453,920. (No model.)

*To all whom it may concern:*

Be it known that I, ALBERT LOEWENTHAL, of 13 Thurmstrasse, Berlin, in the Kingdom of Prussia and German Empire, have invented a new and Improved Cooking-Stove or Warming Apparatus, of which the following is a full, clear, and exact description.

This invention has for its object to obviate the discomfort of being obliged to do without warm foods, which is specially felt in traveling, the apparatus being such that it can be carried in a convenient form in one's pocket, ready for use for the preparation, cooking, warming, &c., of food such as coffee, cocoa, eggs, soup, &c.

In order that this invention may be easily understood and readily carried into practice I will proceed to fully describe the same with reference to the accompanying drawings, in which—

Figure I is a longitudinal sectional elevation of the apparatus. Fig. II is a top view with the cover taken off. Fig. III is a transverse vertical section. Fig. IV is a side elevation showing the apparatus in use; and Figs. V and VI are edge and side views of tongs for removing the cover and other parts of the apparatus.

In constructing an apparatus embodying my invention, the shell or casing is formed preferably somewhat egg-shaped, and in two separable sections A, B, that are united at their meeting edges by knuckles $a$, $b$, that are united by pintles $c$, the section A forming the cover. In each section is a concavity or bowl-shaped depression $a'$, $b'$, and within the shell are the supplementary vessels C, D, of the general shape of the sections A, B, whereby they are snugly received within the section B, and like the latter, are formed with concavities or depressions $c'$, $d'$. The vessel C projects at its edge beyond the shells B, D, and thus forms a guide for the cover A, and serves for retaining a plate P which is elliptical in shape. The plate P has several depresions $p$, for receiving soups or the like, such depressions being covered by a plate Q, that slides in guides $q$, formed on the plate P. Said plate P is also provided with suitable devices for retaining a knife, fork, spoon and the like, and a spirit flask. Below the plate P there is removably fitted an elliptical ring R which corresponds with the curvature of the interior of vessel D, and on such ring folding legs S are hinged as at $s$.

Tongs T are provided as shown in Figs. V and VI, having spurs $z$, that are adapted to engage apertures $z'$, $z'$ in the cover A, and vessels C, D, for removing the same. With this construction the cover A may be removed and inverted so that its depression is adapted to receive a supply of spirits, and above the same the ring R is held for supporting the vessels C, D, and upon the spirits being ignited, foods may be quickly cooked, or warmed.

Having thus fully described my invention, I claim as new and desire to secure by Letters Patent—

1. A portable or pocket stove, comprising a casing formed of two sections fitting one upon the other, each section being provided with a bowl-shaped cavity, whereby the cavity of one section is adapted to hold a supply of spirits or alcohol, when placed under the other section, substantially as described.

2. A portable or pocket stove, comprising two sections provided with depressions, one of said sections being supported above the other by a ring having hinged legs so spaced as to receive between them the upper section, said sections when not in use being capable of forming a case to contain said ring and legs, substantially as described.

3. A portable or pocket stove, comprising two sections having bowl-shaped cavities, a ring provided with hinged legs, for supporting the lower section above the upper one, and a plate supported in the said lower section, substantially as set forth.

4. A portable or pocket stove, comprising two sections, having bowl-shaped depressions or cavities, a ring provided with hinged legs for supporting the lower section, a plate supported in the lower section and provided with pockets, and a cover for the plate, substantially as described.

5. In a portable or pocket stove, the combination with a case formed of two sections, of removable shells arranged within the lower section of the case, the shells projecting one above the other, and a plate resting upon the innermost shell, substantially as described.

In witness whereof I have hereunto set my hand in presence of two witnesses.

ALBERT LOEWENTHAL.

Witnesses:
PAUL FISCHER,
W. H. EDWARDS.